US010402480B2

(12) United States Patent
Aghaiipour

(10) Patent No.: US 10,402,480 B2
(45) Date of Patent: Sep. 3, 2019

(54) PDF TO WEB FORM CONVERSION

(71) Applicant: Experian Health, Inc., Franklin, TN (US)

(72) Inventor: Pejman Aghaiipour, Lombard, IL (US)

(73) Assignee: EXPERIAN HEALTH, INC., Franklin, TN (US)

( * ) Notice: Subject to any disclaimer, the term of this patent is extended or adjusted under 35 U.S.C. 154(b) by 0 days.

(21) Appl. No.: 15/471,891

(22) Filed: Mar. 28, 2017

(65) Prior Publication Data

US 2018/0285332 A1  Oct. 4, 2018

(51) Int. Cl.
*G06F 17/22* (2006.01)
*G06F 17/24* (2006.01)

(52) U.S. Cl.
CPC ...... *G06F 17/2264* (2013.01); *G06F 17/2247* (2013.01); *G06F 17/243* (2013.01)

(58) Field of Classification Search
CPC . G06F 17/2264; G06F 17/2247; G06F 17/243
USPC .......................................................... 715/223
See application file for complete search history.

(56) References Cited

U.S. PATENT DOCUMENTS

| | | | | |
|---|---|---|---|---|
| 7,313,757 | B2* | 12/2007 | Bradley | G06F 17/243 |
| | | | | 715/222 |
| 8,397,153 | B1* | 3/2013 | Lee | G06F 17/2247 |
| | | | | 715/204 |
| 2006/0288269 | A1* | 12/2006 | Oppenlander | G06F 17/243 |
| | | | | 715/207 |
| 2010/0223298 | A1* | 9/2010 | Lam | G06F 16/284 |
| | | | | 707/803 |
| 2010/0238195 | A1* | 9/2010 | McGee | G06F 3/04883 |
| | | | | 345/634 |
| 2010/0251092 | A1* | 9/2010 | Sun | G06F 17/243 |
| | | | | 715/222 |
| 2013/0212121 | A1* | 8/2013 | Perelman | G06F 17/211 |
| | | | | 707/769 |
| 2015/0324639 | A1* | 11/2015 | Macciola | H04N 1/00307 |
| | | | | 382/112 |

* cited by examiner

*Primary Examiner* — Stephen S Hong
*Assistant Examiner* — Broderick C Anderson
(74) *Attorney, Agent, or Firm* — Merchant & Gould

(57) ABSTRACT

A PDF to Web form converter operates to establish an image of an uploaded PDF form as an HTML background image of a new Web page. The converter additionally operates to query the uploaded PDF form to determine the name and type of user-interactive fields present in the PDF form, as well as to determine the size and placement of the user-interactive fields. The converter then converts the PDF user-interactive fields to HTML fields having the same type and name, and having a size and pixel location that corresponds to the PDF field. The HTML user-interactive fields are placed atop the HTML background image to present to the user a two layer Web form (e.g., layer one: background, layer two: user-interactive fields) that appears substantially identical to the PDF form.

20 Claims, 6 Drawing Sheets

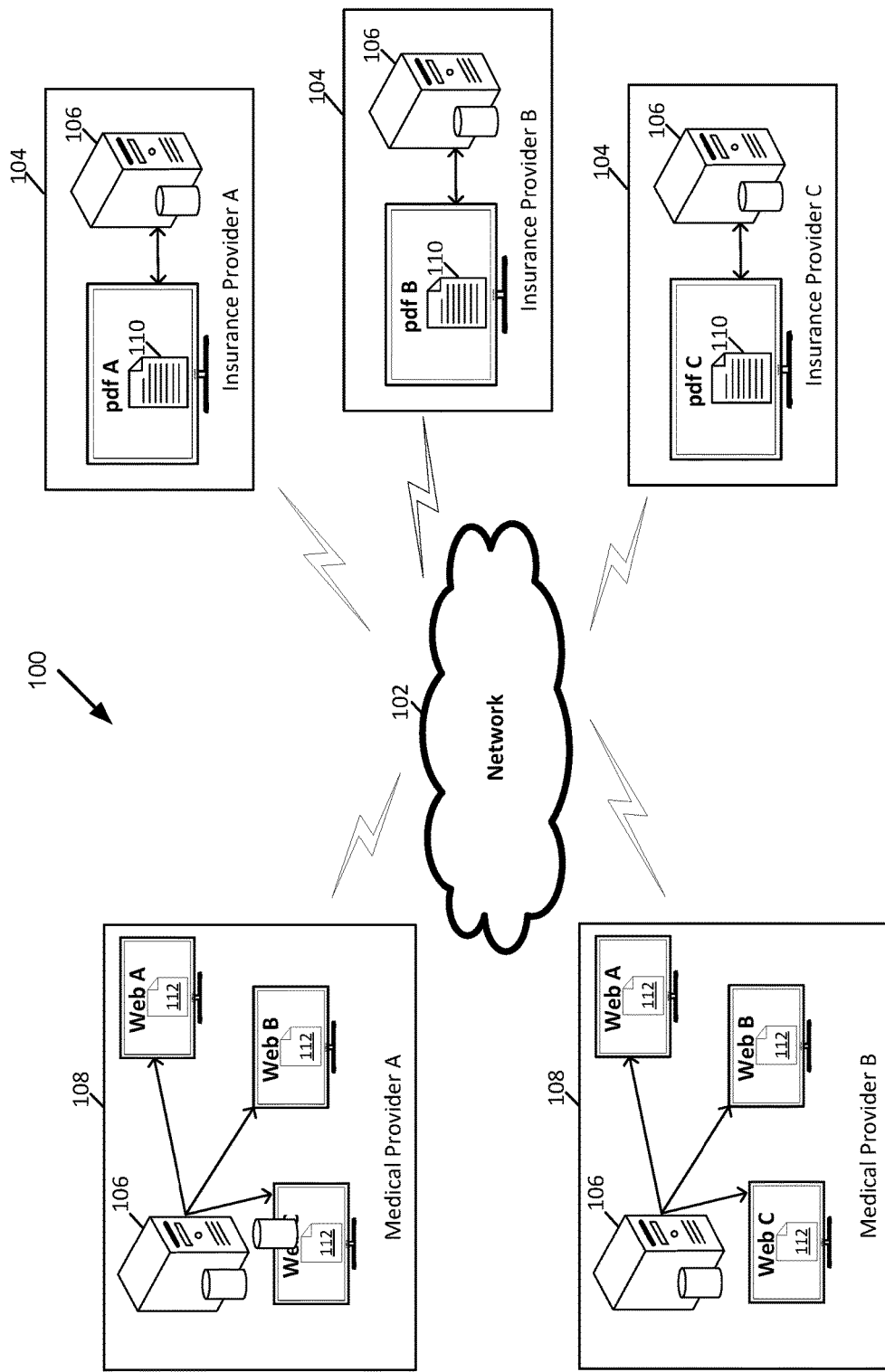

XYZ

Provider Inquiry Process

Please submit all your claims and member-related Inquiries using one of our secure online tools. Most online inquiries are answered in one or two business days.

Claim related Inquiry    Member related Inquiry    General Question
(E.g.: corrected claim, denial review)

| Click to Open the Check a Claim tool | Click to Open the Check Member Information tool | Click to Open the Ask & Track a Question tool |

Within the secure Check a Claim and Check Member Information Web tools, use the drop-down menu to submit your inquiry. Most of the claim details and member information will be filled in automatically.
If you have supporting documentation, you can upload up to three attachments to your inquiry.
After submitting your inquiry, you can track the status using the Ask and Track a Question tool.
If you do not have secure access to XYZCompany.com, click to register. In the meantime you may use the form below and mail it to XYZ Company.

---

Paper Provider Inquiry Form   212

Provider Name: [          ]  National Provider Identifier: [          ]
Address: [          ]
City: [          ] State: [          ] Zip Code: [          ]
Contact Name: [          ] Contact Phone Number: [          ]
Member ID (including alpha prefix): [          ]
Federal Employee Program (FEP) Member: ☐
Member Name: [          ]  Patient Name: [          ]
Date(s) of Service: [          ]  Date of inquiry: [          ]
ICN(s): [          ]
Total Charges: [          ]
Question details

```
                          212
```

☐ Attachments
    Mail to: XYZ Company          Mail to: XYZ Company
    Provider Service Center       Provider Service Center
    P.O. Box 5555                 5555, Provider street
    New York, NY 55555-5555       New York, NY 55555

FIG. 2

Provider Inquiry Process

Please submit all your claims and member-related Inquiries using one of our secure online tools. Most online inquiries are answered in one or two business days.

Claim related Inquiry     Member related Inquiry     General Question (E.g.: corrected claim, denial review)

[ Click to Open the Check a Claim tool ]    [ Click to Open the Check Member Information tool ]    [ Click to Open the Ask & Track a Question tool ]

Within the secure Check a Claim and Check Member Information Web tools, use the drop-down menu to submit your inquiry. Most of the claim details and member information will be filled in automatically.
If you have supporting documentation, you can upload up to three attachments to your inquiry. 410
After submitting your inquiry, you can track the status using the Ask and Track a Question tool.
If you do not have secure access to XYZCompany.com, click to register. In the meantime you may use the form below and mail it to XYZ Company.

---

Paper Provider Inquiry Form   412

Provider Name: [ ]    National Provider Identifier: [ ]
Address: [ ]
City: [ ]   State: [ ]   Zip Code: [ ]
Contact Name: [ ]   Contact Phone Number: [ ]
Member ID (including alpha prefix): [ ]
Federal Employee Program (FEP) Member: [ ]
Member Name: [ ]   Patient Name: [ ]
Date(s) of Service: [ ]   Date of inquiry: [ ]
ICN(s): [ ]
Total Charges: [ ]
Question details

[ 412 ]

[ ] Attachments

Mail to: XYZ Company     Mail to: XYZ Company
Provider Service Center     Provider Service Center
P.O. Box 5555     5555, Provider street
New York, NY 55555-5555     New York, NY 55555   410

( SUBMIT )

PDF TO WEB FORM CONVERSION

BACKGROUND

Many industries rely on forms as a device for tracking the initiation, execution and closing of a transaction. The form serves as a record of the parties involved and the type business transacted, e.g., products sold or services provided, and the monetary cost of the transaction. This is particularly true in the medical services industry where most patients seen by a medical provider are insured through one or more insurance providers each of which requires that any request for reimbursement of a medical expense be submitted on an insurance provider-approved claim form. These claim forms are most often provided in the form of a PDF (portable document format) requiring a user of the form to use ADOBE ACROBAT® (available from Adobe Systems, Inc. of San Jose, Calif.) for manual data entry. However, the use of PDF forms limits the efficiencies that could be obtained through a Web-based system capable of using a database for auto-population of data fields within Web-based forms.

BRIEF SUMMARY

The present disclosure provides systems and methods for the conversion of PDF forms to Web forms. More specifically, the conversion is performed by a custom Web tool, e.g., a PDF to Web form converter, whose programming uses only HTML (Hypertext Markup Language) and CSS (Cascading Style Sheets); JAVASCRIPT™ (provided by Oracle Corp. of Redwood Shores, Calif.) is not required for the conversion.

In one aspect, the PDF to Web form converter operates to establish an image of an uploaded PDF form as an HTML background image of a new Web page. The PDF to Web form converter additionally operates to query the uploaded PDF form to determine the name and type of user-interactive fields present in the PDF form, as well as to determine the size and placement of the user-interactive fields. The PDF to Web form converter then converts the PDF user-interactive fields to HTML user-interactive fields having the same type and name, and having a size and pixel location that corresponds to the PDF form field. The size of the background image, as well as the size and pixel location in the Web form can be scaled larger or smaller than the PDF form to accommodate a Web page presentation. The HTML user-interactive fields are placed atop the HTML background image to present to the user a two layer Web form (e.g., layer one: background, layer two: user-interactive fields) that appears substantially identical to the PDF form.

The HTML Web form provides a user-interactive form that has browser-compatible Web access, that has the ability to save user-submitted data from the user-interactive fields in association with the field identifiers (e.g., field names originally defined by the PDF form), and that has the ability to pre-populate one or more of the user-interactive fields with a model object.

In another aspect, the PDF to Web form converter is configured to integrate with an existing software platform. In this configuration, the PDF to Web form converter defines the background image, the type and name of the user-interactive fields, as well as the size and location of the user-interactive fields in a language or format this is compatible with the existing software platform. In certain examples, to enable operability with the existing software platform, the PDF to Web form converter replaces the name of the user-interactive fields to a corresponding data path within the software platform so that the software platform can save or pre-populate data in the Web form. A transformer is used within the software platform to transform the web form defined in the platform language, or format, to HTML for display and access of the Web form with data path mapped user-interactive data fields.

Aspects of systems and methods described herein may be practiced in hardware implementations, software implementations, and in combined hardware/software implementations. This summary is provided to introduce a selection of concepts; it is not intended to identify all features or limit the scope of the claimed subject matter.

BRIEF DESCRIPTION OF THE DRAWINGS

The accompanying drawings, where are incorporated in and constitute a part of this disclosure, illustrate various aspects, and examples of the present invention. In the drawings:

FIG. 1 is a schematic of an example environment in which a PDF to Web form converter of the present disclosure can be implemented.

FIG. 2 is an example of a PDF form.

FIG. 4 is an example of an HTML Web form converted from the PDF form of FIG. 2 by the PDF to Web form converter.

DETAILED DESCRIPTION

Figure 3:
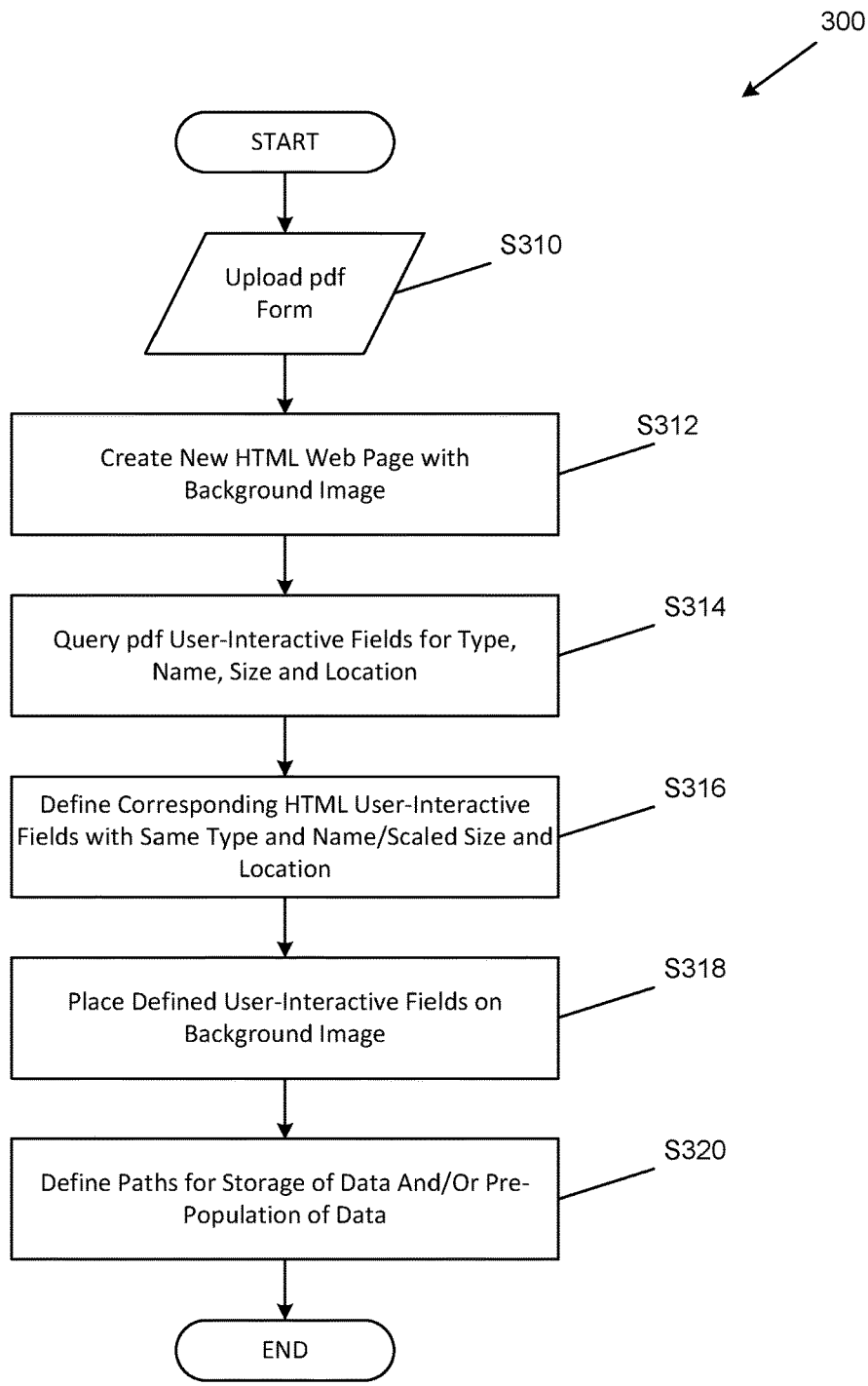
FIG. 3 is a flowchart illustrating an example process that can be performed by the PDF to Web form converter.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

The PDF to Web form converter operates to establish an image of an uploaded PDF form as an HTML background image of a new Web page. The PDF to Web form converter additionally operates to query the uploaded PDF form to determine the name and type of user-interactive fields present in the PDF form, as well as to determine the size and placement of the user-interactive fields. The PDF to Web form converter then converts the PDF user-interactive fields to HTML user-interactive fields having the same type and name, and having a size and pixel location that corresponds to the PDF form field. The size of the background image, as well as the size and pixel location can be scaled larger or smaller than the PDF form to accommodate a Web page presentation. The HTML user-interactive fields are then placed atop the HTML background image to present to the user a two layer Web form (e.g., layer one: background, layer two: user-interactive fields) that appears substantially identical to the PDF form, albeit with the additional features of browser-compatible Web access, the ability to save user-submitted data from the user-interactive fields in association with the field identifiers, and the ability to pre-populate one or more of the user-interactive fields with a model object.

The particular examples provided herein are described in the context of the medical industry including insurance providers and medical providers. However, it is to be understood that the systems and methods described herein are equally applicable to other industries and to any situation where efficiencies or other benefits might be obtained by converting PDF forms to Web forms. Further, reference is made to the software platform CLAIMSOURCE® (provided by Experian, Inc. of Dublin, Ireland), with which the PDF to Web form converter can be made compatible. CLAIMSOURCE® is an example of one of many software platforms in any variety of industries with which the PDF to Web form converter can be made compatible, FIG. 1 illustrates an example environment 100 in which conversion of PDF (portable document format) forms to Web forms can take place. As shown, the environment includes a network 102, which may be wired or wireless, enabling communication between one or more PDF form generators 104, which generally comprise a computing device 106 such as a server, workstation, desktop computer, laptop computer, tablet, smart device, etc., and a PDF to Web form converter 108, which similarly comprises a computing device 106. Further details on the computing device 106 and its many variations can be found in FIG. 6. In the example of FIG. 1, the PDF form generators 104 generate PDF forms 110, such as insurance claim forms, required by each of the insurance providers (e.g., Insurance Provider A-C), for claim submission. Further, in the example of FIG. 1, the PDF to Web form converters 108 convert the PDF forms 110 to corresponding Web forms 112 that can be more easily used by medical providers (e.g., Medical Providers A-B). The PDF to Web form converter 108 can generally be described as a Web tool, or Web development tool, for converting PDF forms to Web forms using only HTML (Hypertext Markup Language) and CSS (Cascading Style Sheets); use of JAVASCRIPT™ is not required.

FIG. 2 illustrates an example of a PDF form 200. As shown, the PDF form 200 includes text and/or graphics only portions 210 as well as user-interactive data fields 212 (for drawing clarity, only a few have been identified) for user-entry of name, address, ID, etc. Each of the data fields is provided with a corresponding identifier 214 as well as a programmed identifier. The idea behind a PDF (portable document format) form is that the form itself is in a file format that enables its presentation independent of application software, hardware, and operating systems. However, in order to view the PDF form a user must have some type of PDF reader on or accessible by their computing device 106 and to interact (e.g., edit or add a signature) with the PDF form the user must have some type of a PDF editor, (e.g., ACROBAT PRO™, available from Adobe Systems, Inc. of San Jose, Calif.) on or accessible by the computing device 106. Presuming a user does have a PDF editor, the user-interactive data fields 212 of the form 200 are generally configured to receive data through keyboard entry while a user is viewing the form. The ability to auto-populate the user-interactive data fields 212 of the PDF form 200 are limited, if not non-existent. Accordingly, when dealing with large catalogs of different forms that are required to document transactions in a high volume business (e.g., the medical industry, where doctors, clinics, hospitals or other providers of medical services submit medical insurance claim forms to insurance providers for virtually every patient that passes through the medical providers' doors), efficiencies in relation to the forms can save both time and money. The PDF to Web form converter 108 can provide these efficiencies and/or other benefits by converting a PDF form to a Web form that can be accessed through Web-based systems and can be auto-populated from stored data.

FIG. 3 provides a flow chart illustrating an example of the operational stages that can be performed by a PDF to Web form converter method 300. In the most general terms, the PDF to Web form converter method 300 operates to convert an uploaded PDF form, such as PDF form 200, to a resultant Web form. In certain embodiments, the resultant Web form is a generic form, e.g., an HTML form present in one or more online pages, which is accessible by a Web browser, that allows a user to enter data in defined data fields and/or enable auto-population of some or all of the defined data fields from stored data. In certain embodiments, the resultant Web form is a customized form, e.g., an HTML form made compatible with the programming language of an existing software platform.

Referring to FIG. 3, the PDF to Web form converter method 300 operates in the context of an integrated development environment (IDE), e.g., Microsoft Corporation's (of Redmond, Wash.) VISUAL STUDIO™, to which a PDF form has been uploaded, S310. Once the PDF form has been uploaded, the PDF to Web form converter method 300 operates to establish a generic Web form by first defining an image of the entire PDF form as the background image of a new Web page, S312. In certain embodiments, the background image is established through a data URI (uniform resource identifier) to an encrypted link of a portable network graphics (or other format) image of the PDF, e.g., "data:image/png:base64, <data>." In certain embodiments, the image of the PDF form is scaled to accommodate the Web-based presentation of the form.

Further, the PDF to Web form converter method 300 operates to query the uploaded PDF form to determine the type and names of the user-interactive fields within the PDF form as well as their size and position, S314. The user-interactive field types can include, for example, a text box, a check box, a radio button, or a free text area. The names of the user-interactive fields have been assigned in the PDF form and are maintained in the resultant Web form. In certain embodiments, the IDE operates in conjunction with the iTextSharp library to achieve the functionality of identifying the type and name of the user-interactive fields as well as the sizing of the user-interactive fields and their pixel locations. In certain embodiments, the pixel locations are based from a reference point that comprises the uppermost, leftmost pixel of the uploaded PDF form.

After determining the type, name, size, and position of the user-interactive fields within the uploaded PDF, the PDF to Web form converter method 300 operates to define corresponding HTML user-interactive fields for the Web form that are placed atop the background image, S316. In certain embodiments, the pixel locations of the user-interactive fields for the Web form are based from a reference point that comprises a corresponding uppermost, leftmost pixel of the background image of the Web form. Further, in certain embodiments, the user-interactive fields for the Web form are scaled, e.g., proportionately sized, to the background image of the Web form in the instance that the background image has itself been scaled. In certain embodiments, a formula is used to determine the top, left pixel location of each user-interactive field for the Web form as well as to determine the width and height of the user-interactive field. An example of one such formula is provided below:

$$\text{top} = ((\text{pageHeight} - \text{fieldPosition.position.GetTop}(0)) * \text{bgHeight}) / \text{pageHeight}; \quad \text{Eq. (1)}$$

$$\text{left} = (\text{fieldPosition.position.GetLeft}(0) * \text{bgWidth}) / \text{pageWidth}; \quad \text{Eq. (2)}$$

$$\text{width} = (\text{fieldPosition.position.Width} * \text{bgWidth}) / \text{pageWidth}; \quad \text{Eq. (3)}$$

$$\text{height} = (\text{fieldPosition.position.Height} * \text{bgWidth}) / \text{pageWidth}; \quad \text{Eq. (4)}$$

Where:
pageHeight: original PDF height
pageWidth: original PDF width
bgHeight: created image based on the scale height
bgWidth: created image based on the scale width The final result of the PDF to Web converter method 300 is a Web page presenting a two-layer (e.g., background and user-interactive fields) HTML Web form that is substantially identical in look and feel to an original PDF form. Notably, the HTML Web form is created using only HTML (and, if necessary when faced with a multi-page form situation, CSS); no JAVASCRIPT™ is required. Further, the resultant HTML Web form provides improved functionality from that provided by the PDF form, for example, browser-compatible Web access, the ability to save user-submitted data from the user-interactive fields in association with the field identifiers (e.g., field names originally defined by the PDF form), and the optional ability to pre-populate one or more of the user-interactive fields with a model object, S318.

An example of the resultant Web form 400 created from converting the PDF form 200 of FIG. 2 is shown in FIG. 4. The Web form 400 is presented in a browser 420 environment with all but the user-interactive fields 412 comprising the background image 410; identifiers 414 are also part of the background image 410. A "submit" button 418 is provided on the Web page enabling the user to save, locally or remotely, any data within the user-interactive fields 412 in association with the established field identifiers.

In certain embodiments, the PDF to Web form converter 108 additionally, or alternatively, operates to accommodate an existing software platform. For example, when considering the medical industry, the software platform might comprise CLAIMSOURCE® from Experian Health. A software platform used in the medical industry may be used for the preparation, management and submission of patient insurance claim forms to a variety of insurance providers. Such medical software platforms are often data-intensive platforms that maintain databases containing data on patients, medical providers, and insurance providers. As such, these software platforms often rely on XML (extensible markup language) to manage the storing and transport of data within the platform.

Figure 5:
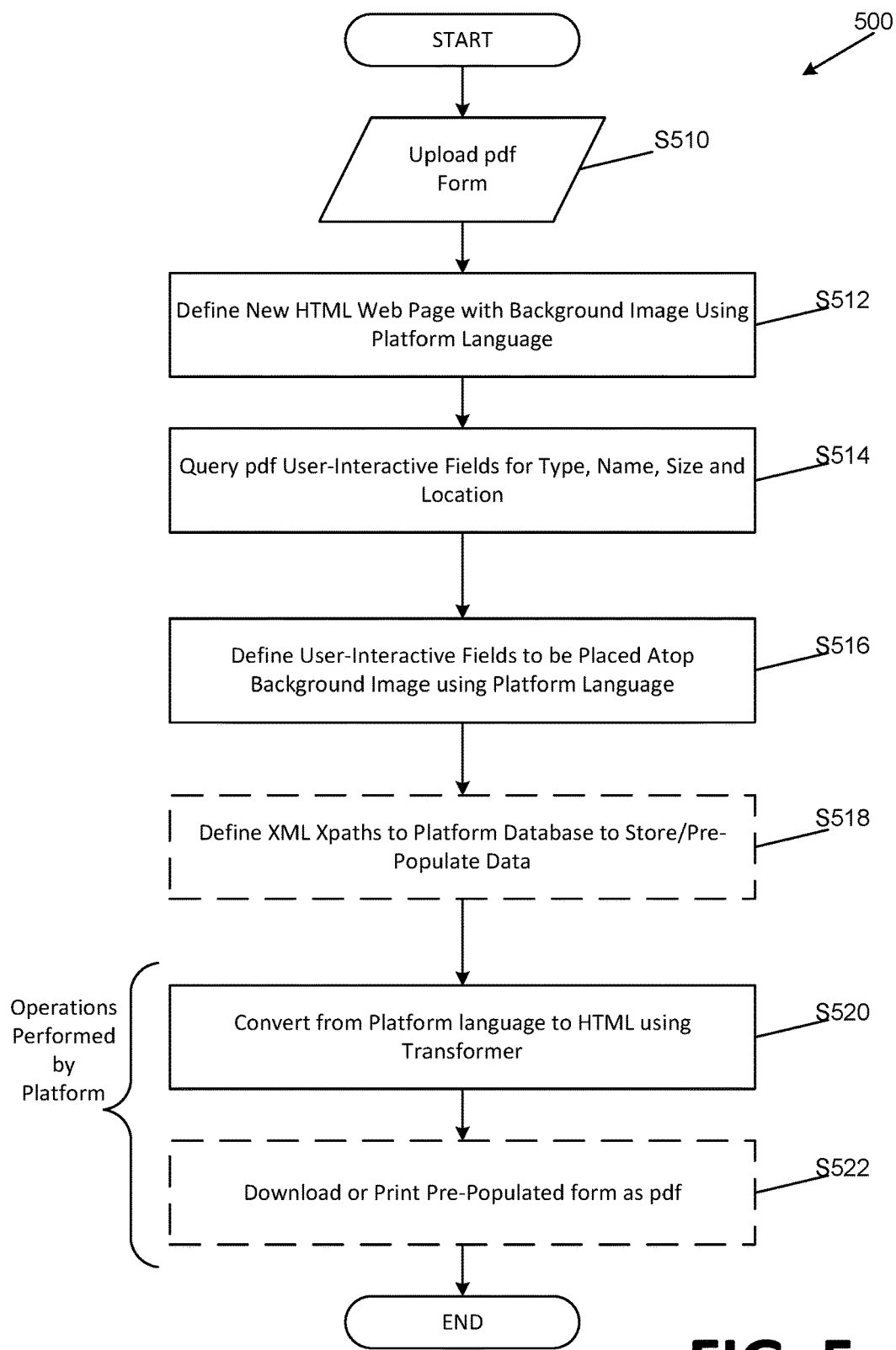
FIG. 5 is a flowchart illustrating an example process that can be performed by the PDF to Web form converter.

The flowchart of FIG. 5 illustrates a PDF to Web form converter method 500 that can be used with the software platform. The PDF to Web form converter method 500 operates in the context of an integrated development environment (IDE), e.g. Microsoft Corporation's VISUAL STUDIO™, to which a PDF form has been uploaded, S510. Once the PDF form has been uploaded, the PDF to Web form converter method 500 operates to establish a software platform compatible Web form by first defining an image of the entire PDF form as the background image of a new Web page using the software platform language or format, S512. In certain embodiments, the background image is defined through a data URI (uniform resource identifier) to an encrypted link of a portable network graphics (or other format) image of the PDF, e.g., "data:image/png:base64, <data>." In certain embodiments, the image of the PDF form is scaled to accommodate the Web-based presentation of the form.

Further, the PDF to Web form converter method 500 operates to query the uploaded PDF form to determine the type and names of the user-interactive fields within the PDF form as well as the size and position, S514. The user-interactive field types can include, for example, a text box, a check box, a radio button, or a free text area. In certain embodiments, the IDE operates in conjunction with the iTextSharp library to achieve the functionality of identifying the type and name of the user-interactive fields as well as the sizing of the user-interactive fields and their pixel locations. In certain embodiments, the pixel locations are based from a reference point that comprises the uppermost, leftmost pixel of the uploaded PDF form.

After determining the type, name, size and position of the user-interactive fields within the uploaded PDF, the PDF to Web form converter method 500 operates to define corresponding user-interactive fields including type, name, size and position atop the background image that are compatible with the specific language and/or formats of the software platform, S516. In certain examples, such as in a software platform (e.g., CLAIMSOURCE®), the PDF to Web form converter method 500 also sets the user-interactive field names to XML Xpaths, S518. The Xpaths are directed to the software platform database so that platform can save or pre-populate the data from that database. For example, the PDF to Web form converter 108 finds "Provider Name" as a field identifier among the fields of the uploaded PDF, then uses a dictionary (e.g., a cross-referencing table) to find the corresponding Xpath used in the platform and replaces the PDF field name to the platform's storing path.

In certain embodiments, the pixel locations of the user-interactive fields are based from a reference point that comprises a corresponding uppermost, leftmost pixel of the background image of the Web form. Further, in certain embodiments, the user-interactive fields for the Web form are scaled, e.g., proportionately sized, to the background image of the Web form in the instance that the background image has itself been scaled. In certain embodiments, a formula, such as the formula provided above with respect to the flowchart of FIG. 3, is used to determine the top, left pixel location of each user-interactive field for the Web form as well as to determine the width and height of the user-interactive field.

With the type, name, size and position of each of the user-interactive fields for the Web form defined in a language and/or formats compatible with the language of the software platform, a transformer (e.g., an XSLT transformer) operable with the software platform operates to convert the defined user-interactive fields from the software platform compatible language to HTML, S520. The final result is a Web page presenting a two-layer (e.g., background and user-interactive fields atop the background image) HTML Web form that is substantially identical in look and feel to an original PDF form. Notably, the HTML Web form is created using only HTML (and, if necessary when faced with a multi-page form situation, CSS); no JAVASCRIPT™ is required.

In certain examples, the software platform can optionally enable a user to convert the HTML Web form back to a PDF form, S522, that incorporates the defined Xpaths to the software platform database, enabling pre-population of the PDF with software platform data. The user may download or print the pre-populated PDF form.

Figure 6:
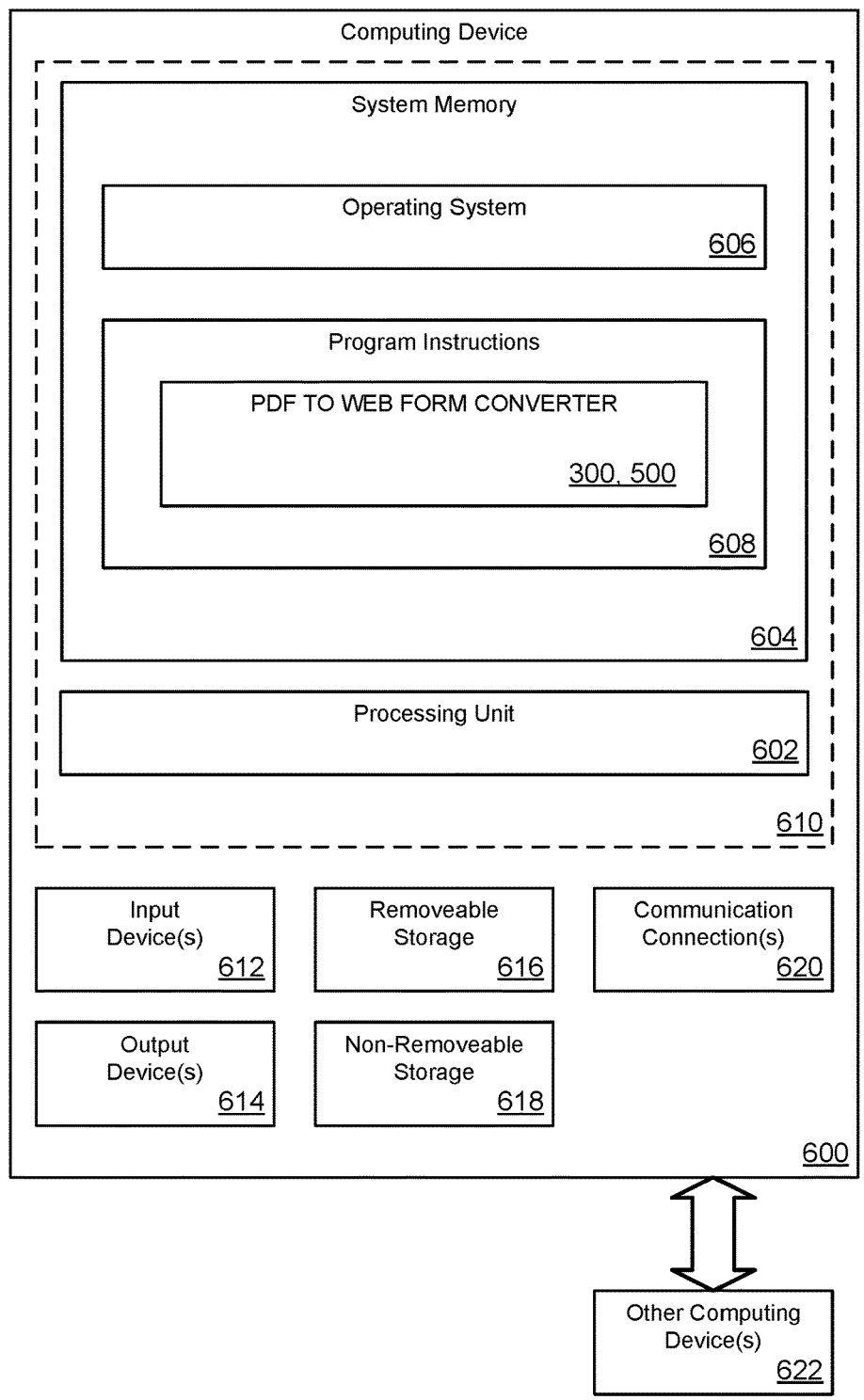
FIG. 6 is a block diagram illustrating physical components of an example computing device with which aspects of the present disclosure can be practiced.

FIG. 6 is a block diagram illustrating physical components of an example computing device with which aspects of the present disclosure may be practiced. The computing device 600 can include at least one processing unit (processor) 602 and a system memory 604. The system memory 604 may comprise, but is not limited to, volatile (e.g. random access memory (RAM)), non-volatile (e.g. read-only memory (ROM)), flash memory, or any combination thereof. System memory 604 may include operating system 606, one or more program instructions 608, and may include sufficient computer-executable instructions for the PDF to Web form converter method 300 and/or PDF to Web form converter method 500, which when executed, perform functionalities as described herein. Operating system 606, for example, may be suitable for controlling the operation of computing device 600. Furthermore, aspects may be practiced in conjunction with a graphics library, other operating systems, or any other application program and is not limited to any particular application or system. This basic configuration is illustrated by those components within a dashed line 610. Computing device 600 may also include one or more input device(s) 612 (keyboard, mouse, pen, touch input device, etc.) and one or more output device(s) 614 (e.g., display, speakers, a printer, etc.).

The computing device 600 may also include additional data storage devices (removable or non-removable) such as, for example, magnetic disks, optical disks, or tape. Such additional storage is illustrated by a removable storage 616 and a non-removable storage 618. Computing device 600 may also contain a communication connection 620 that may allow computing device 600 to communicate with other computing devices 622, such as over a network in a distributed computing environment, for example, an intranet or the Internet. Communication connection 620 is one example of a communication medium, via which computer-readable transmission media (i.e., signals) may be propagated.

Programming modules may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Furthermore, aspects may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in any other circuits or systems.

Aspects may be implemented as a computer process (method), a computing system, or as an article of manufacture, such as a computer program product or computer-readable storage medium. The computer program product may be computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data or computer-executable instructions readable by a computing device. The term computer-readable storage media do not include computer-readable transmission media.

Aspects of the present invention may be used in various distributed computing environments where tasks are performed by remote processing devices that are linked through a communications network.

Aspects of the invention may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 600 or any other computing devices 622, in combination with computing device 600, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this application are intended to provide a thorough and complete disclosure the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

I claim:

1. A method comprising:
   uploading a PDF (portable document format) form to the Web;
   establishing the PDF form as a background image to a Web page comprising a user-interactive HTML (hypertext markup language) Web form, the background image established through a data URI (uniform resource identifier) to an encrypted link and comprising a first layer of the user-interactive HTML Web form;
   querying the PDF form to determine a type, name, size and location of one or more user-interactive fields in the PDF form;
   defining an HTML user-interactive field corresponding to each of the one or more user-interactive fields in the PDF form for placement atop the background image to establish the user-interactive HTML Web form; and
   providing the user-interactive HTML Web form that corresponds in appearance to the PDF form comprising the background image of the PDF form as the first layer of the user-interactive HTML Web form and the HTML user-interactive fields as a second layer of the user-interactive HTML Web form.

2. The method of claim 1, wherein establishing the PDF form as the background image includes scaling the background image to a size suitable for a Web display.

3. The method of claim 1, wherein defining the HTML user-interactive field includes defining a type, name, size and location of the HTML user-interactive field including applying a formula to determine a first pixel location of each HTML user-interactive field and a width and height of each HTML user-interactive field.

4. The method of claim 3, wherein defining the HTML user-interactive field includes scaling the size and location of the HTML user-interactive field proportionately to a scaling applied to the background image.

5. The method of claim 1, wherein the HTML user-interactive fields of the user-interactive HTML Web form comprise: a text box, a check box, a radio button, or a free text area.

6. The method of claim 1, wherein the method is performed without using JavaScript.

7. The method of claim 1, further comprising enabling saving of data entered into the HTML user-interactive fields to a local or remote location.

8. A PDF to Web form converting system comprising:
   a processor configured to execute only HTML (hypertext markup language) and CSS (cascading style sheets) instructions stored in a memory, wherein the execution of the instructions causes the processor to:
   upload a PDF (portable document format) form to the Web;
   establish the PDF form as a background image to a Web page comprising a user-interactive HTML (hypertext markup language) Web form, the background image established through a data URI (uniform resource identifier) to an encrypted link and comprising a first layer of the user-interactive HTML Web form;
   query the PDF form to determine a type, name, size and location of one or more user-interactive fields in the PDF form;
   define an HTML user-interactive field corresponding to each of the one or more user-interactive fields in the PDF form for placement atop the background image to establish a user-interactive HTML Web form; and
   providing the user-interactive HTML Web form that corresponds in appearance to the PDF form comprising the background image of the PDF form as the first layer of the user-interactive HTML Web form and the HTML user-interactive fields as a second layer of the user-interactive HTML Web form.

9. The system of claim 8, wherein the execution of the instructions causing the processor to establish the PDF form as the background image further causes the processor to scale the background image to a size suitable for a Web display.

10. The system of claim 8, wherein the execution of the instructions causing the processor to define the HTML user-interactive field further causes the processor to define a type, name, size and location of the HTML user-interactive field.

11. The system of claim 10, wherein the execution of the instructions causing the processor to define the HTML user-interactive field further causes the processor scale the size and location of the HTML user-interactive field proportionately to a scale applied to the background image.

12. The system of claim 8, wherein the HTML user-interactive fields of the user-interactive HTML Web form comprise: a text box, a check box, a radio button, or a free text area.

13. The system of claim 8, wherein the execution of the instructions causes the processor to additionally: enable saving of data entered into the HTML user-interactive fields to a local or remote location.

14. A user-interactive HTML (hypertext markup language) Web form comprising:
   an HTML background image obtained from a PDF form that has been uploaded to the Web, the background image established through a data URI (uniform resource identifier) to an encrypted link and comprising a first layer of the user-interactive HTML Web form; and
   an HTML user-interactive field positioned atop the HTML background image, wherein the HTML user-interactive field is of a same type as a corresponding user-interactive field of the uploaded PDF form, wherein the background image of the PDF form comprises the first layer of the user-interactive HTML Web form and the HTML user-interactive field comprises a second layer of the user-interactive HTML Web form.

15. The Web form of claim 14, wherein the HTML user-interactive field is positioned at a corresponding location and is of a corresponding size as the user-interactive field of the uploaded PDF form.

16. The Web form of claim 15, wherein the HTML background image is scaled for a Web display and wherein the HTML user-interactive field is scaled in proportion to the HTML background image.

17. The Web form of claim 14, wherein the HTML user-interactive field comprises: a text box, a check box, a radio button, or a free text area.

18. The Web form of claim 14, wherein the Web form is configured for population by a model object.

19. The Web form of claim 14, wherein the HTML user-interactive field is defined with the same name as the corresponding user-interactive field of the uploaded PDF form.

20. The Web form of claim 14, wherein the HTML user-interactive field is defined with a path to a database.

\* \* \* \* \*